United States Patent
Betensky et al.

[11] 3,840,290
[45] Oct. 8, 1974

[54] ZOOM LENS SYSTEM HAVING FOUR MOVABLE MEMBERS

[75] Inventors: Ellis I. Betensky, Stamford; Alfred Schwarz, Westport, both of Conn.

[73] Assignee: The United States of America as represented by the Secretary of the Navy, Washington, D.C.

[22] Filed: Aug. 13, 1973

[21] Appl. No.: 387,878

[52] U.S. Cl. ............... 350/184, 350/176, 350/177, 350/186
[51] Int. Cl. .................. G02b 15/14, G02b 1/00
[58] Field of Search ............ 350/184, 176, 177, 186

[56] References Cited
UNITED STATES PATENTS
| | | | |
|---|---|---|---|
| 3,482,900 | 12/1969 | Wagner | 350/176 |
| 3,512,872 | 5/1970 | Lynch et al. | 350/184 X |
| 3,377,119 | 4/1968 | Takano | 350/184 |

*Primary Examiner*—Paul A. Sacher
*Attorney, Agent, or Firm*—R. S. Sciascia; Henry Hansen

[57] ABSTRACT

A zoom lens system having four movable lens groups, the focal length thereof being continuously variable over a range of substantially 6 to 18 inches.

3 Claims, 3 Drawing Figures

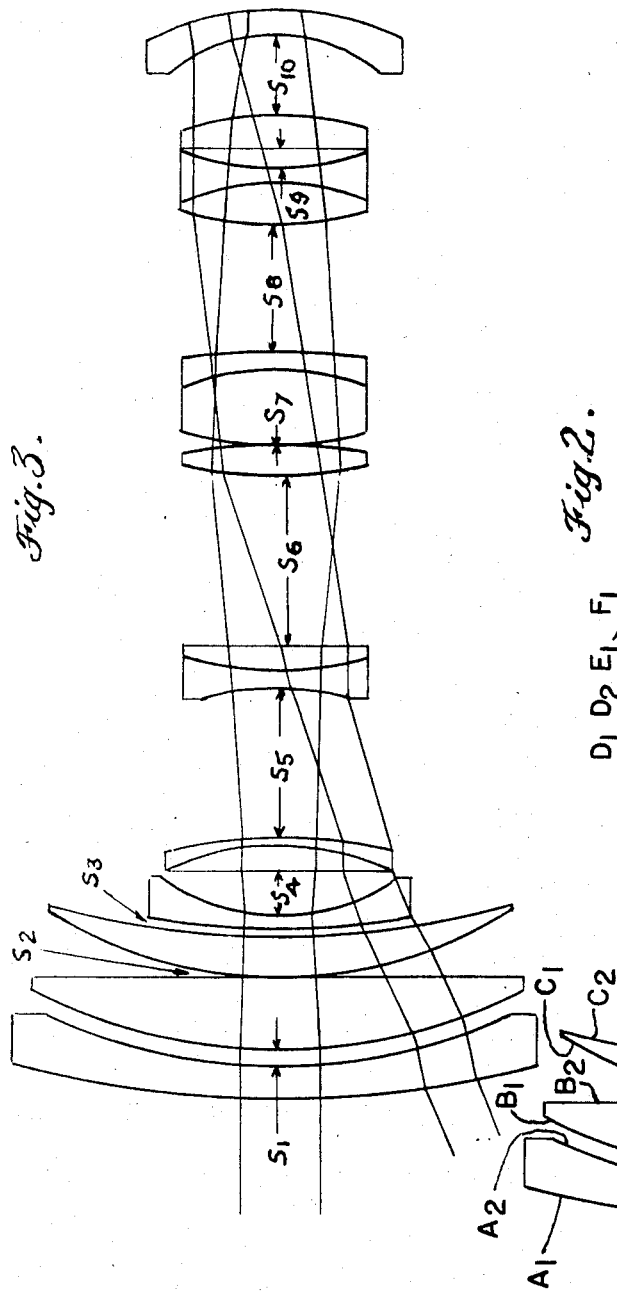
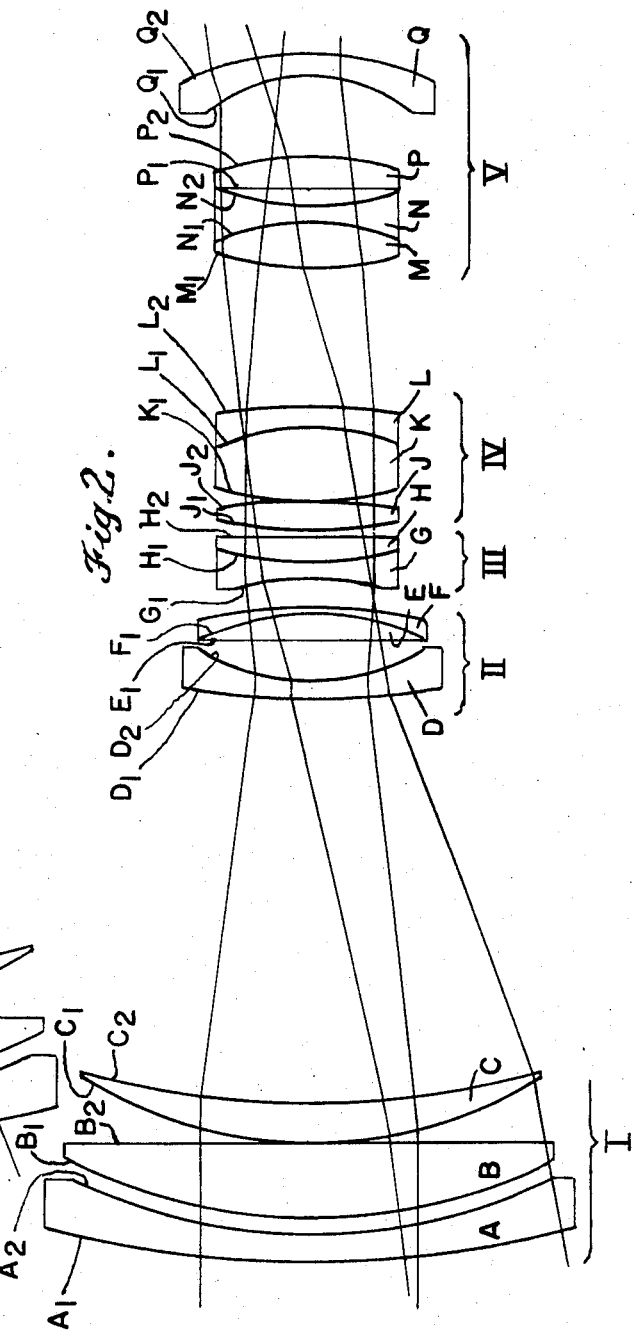

ZOOM LENS SYSTEM HAVING FOUR MOVABLE MEMBERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to zoom lens systems and more particularly it relates to a zoom-type of lens assembly having a variable focal length over a range of substantially 6 to 18 inches.

Such a zoom lens assembly has a particularly useful application in reconnaissance aircraft wherein the object being viewed may be examined with greater or lesser detail according to the particular setting of the variable focal length. Prior zoom lens systems often proved costly and bulky in order to provide good resolution. Large lens elements, in particular, required the use of expensive glass materials that were difficult to grind and polish.

SUMMARY OF THE INVENTION

It is an object of the present invention to provide a high quality lens suitable for aircraft reconnaissance applications.

Other objects of the present invention are to reduce cost and lessen fabrication problems. In particular, the glass types chosen are all readily available in the necessary sizes. Relatively inexpensive materials are used with the large lens elements in order to avoid prohibitive costs. Glass materials prone towards striations or which are difficult to grind or polish have been avoided throughout the design.

It is a further object of the invention to minimize the weight of the system so as not to exceed 50 pounds.

Briefly, these and other objects are accomplished by a lightweight, compact zoom lens assembly that moves a series of four discrete lens groups through a plurality of axial distances which produce a focal length range of 6 to 18 inches. When manufactured according to normal reconnaissance quality specifications, the lens is capable of a resolution of 74 line pairs per millimeter Area Weighted Average Resolution (AWAR) with type 3,400 or comparable film at a 6 inch focal length, and improves to approximately 83 line pairs per millimeter AWAR at an 18 inch focal length at a relative aperture of f/5.0. The maximum front vertex distance is 24 inches.

For a better understanding of these and other aspects of the invention, reference may be made to the following detailed description taken in conjunction with the accompanying drawings.

BRIEF DESCRIPTION OF THE DRAWINGS

FIG. 2 is an optical diagram of the lenses of FIG. 1 in the maximum focal length position; and FIG. 3 is an optical diagram of the lenses of FIG. 1 in the minimum focal length position with noted airspaces.

DESCRIPTION OF THE PREFERRED EMBODIMENT

Figure 1:
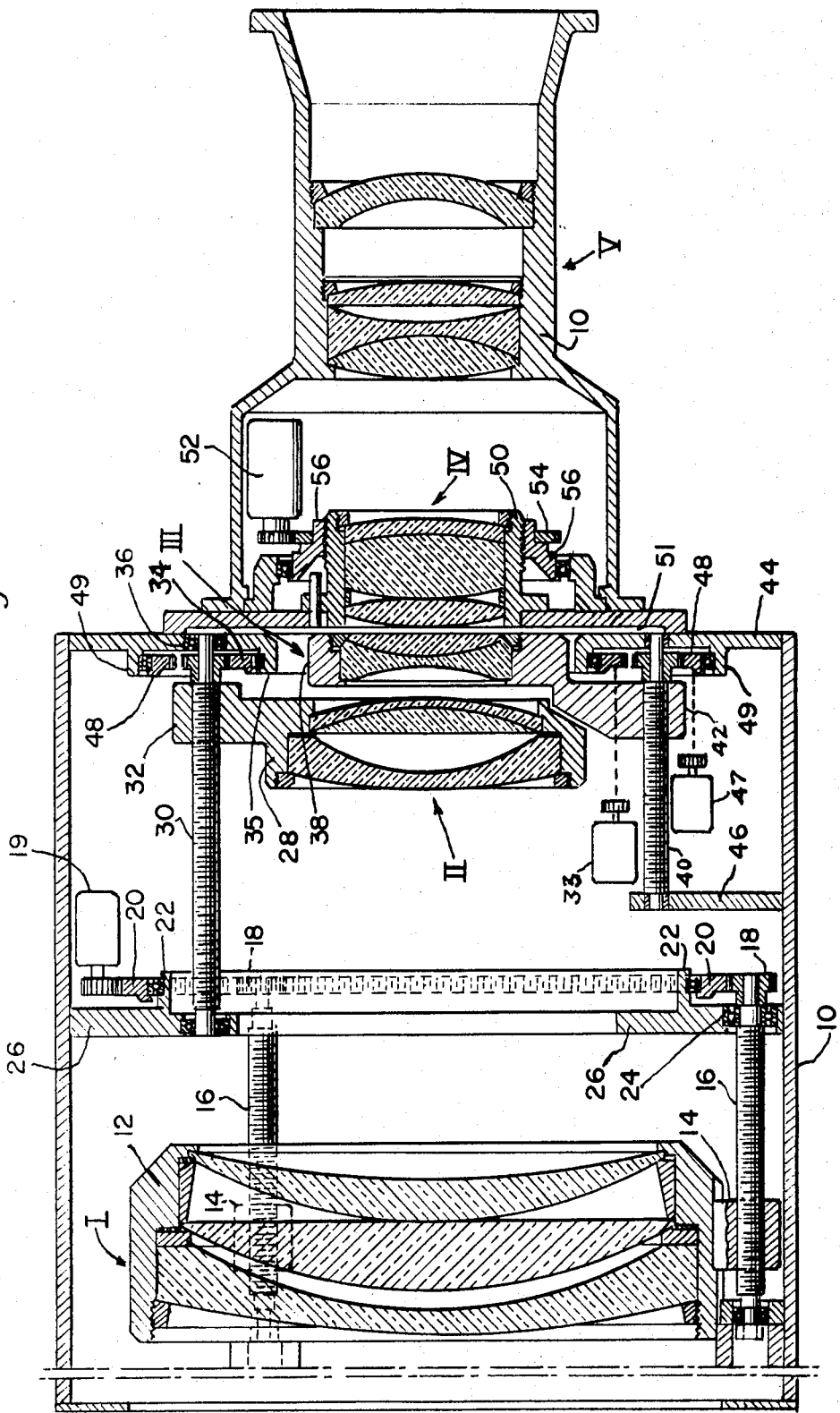
FIG. 1 is a cross-sectional view of a preferred embodiment of the present invention in the maximum focal length position.

Referring now to FIG. 1, there is provided a lens tube 10 for housing all of the lenses and mechanical components of the invention. There are four lens groups I, II, III, IV which are moved in order to effect the various focal lengths. Lens group I comprising lens A, B and C is mounted in a round cell 12 having lead-nuts 14. The lead-nuts 14 travel by means of lead-screws 16 thereby moving lens group I an approximate total axial distance of 44 millimeters (mm.). Each lead-screw 16 is equipped with a pinion 18 which is synchronously driven by a motor 19 through external gear ring 20 that is supported on ball bearings about annular boss 22 extending from cross wall 26. Bearings 24 for each of the lead-screws are mounted in the cross wall 26.

Lens group II comprises three lenses D, E and F mounted in a round cell 28 attached to lead-screw 30 by means of lead-nut 32. An external gear ring 34 driven by a motor 33 is supported on ball bearings about annular boss 35 extending from cross wall 44 and drives the lead-screw 30 an approximate axial distance of 112 mm. by means of pinion 36. It is contemplated within the scope of the present invention that the gear rings 20 and 34 can be manually actuated or may be electrically driven by motors as shown.

Lens group III comprises two lenses G and H mounted in a round lens cell 38 attached to a lead-screw 40 by means of a lead-nut 42. Cross wall 44, as well as bearing support 46, supports the bearings for the lead-screw 40 of lens group III. Lens group III is driven by a motor 47 through an internal gear ring 48 which is supported on ball bearings within annular boss 49 extending from cross wall 44. Lens cell 38 moves an approximate axial distance of 64 mm.

The last movable lens group IV comprising three lenses J, K and L fixably mounted in lens cell 50 has a relatively short total axial movement of approximately 10 millimeters. A fixed aperture 51 is placed forward of lens group IV. A motor 52 drives an external ring gear 54 attached to a threaded member 56 which rotates in order to provide axial movement to the lens cell 50.

It is contemplated within the scope of the present invention that additional lead-screws and lead-nuts or, alternatively, guide shaft assemblies may be appended to any of the foregoing lens groups in order to facilitate stability and movability within the zoom lens system. It should also be obvious to one skilled in the art that the manipulation of the four movable lens groups within the zoom system may be accomplished either individually or in conjunction with each other by the use of conventional mechanical, electro-mechanical or electronic devices.

The fifth lens group V consisting of lenses M, N, P and Q is fixably mounted in the lens tube 10.

Referring now to FIG. 2, the 15 lenses A – Q are positioned in the maximum focal length of 18 inches. The airspaces between the different lenses are shown in FIG. 3 which illustrates the lenses in their minimum focal length position. The front and rear surfaces of each lens are denoted in the drawing and hereinafter with the subscripts 1 and 2 respectively. For example, the front and rear surfaces of lens A are $A_1$ and $A_2$. The first movable lens group I comprises a singlet negative meniscus lens A. Next rearwardly is a double convex lens B which is spaced at a fixed distance $S_1$ from lens A. A single negative meniscus lens C lies at a fixed distance $S_2$ rearwardly from lens B.

Separated from lens group I by a variable airspace $S_3$ and comprised in a second movable lens group II is a singlet negative meniscus lens D. Next rearwardly from lens D at a fixed distance $S_4$ is a doublet lens component comprising a positive meniscus lens E and a negative meniscus lens F having its front surface in contact with lens E.

The third movable lens group III, separated from lens group II by a variable airspace $S_5$, is a doublet lens component comprising a double concave lens G and a double convex lens H having its front surface in contact with the rear surface of lens G.

The rearmost and fourth movable lens group IV is separated from lens group III by a variable airspace $S_6$ and comprises three lenses J, K and L. The front lens J is double convex. Next rearwardly from lens J and at a fixed distance $S_7$ is the double convex lens K. In contact with the rear surface of lens K lies a negative meniscus lens L.

Lens group V comprises four lenses M, N, P and Q. All of the lenses M – P are fixably mounted within the lens tube at the image end of the zoom lens system. Lens group V is separated from lens group IV by a variable airspace $S_8$. Lens M is double convex. Next rearwardly from lens M is a double concave lens N having its front surface in contact with the rear surface of lens M. Positive meniscus lens P is separated from lens N by a fixed distance $S_9$. Separated at a fixed distance $S_{10}$ from lens P lies a single negative meniscus lens Q.

Referring now to FIG. 3 there is shown the lenses A – Q of the zoom lens system configured for the minimum focal length position of 6 inches. Lens group I is now in its rearmost position, lens groups II and III are in their maximum forward positions and lens group IV is in its rearmost position. Airspaces $S_1$ – $S_{10}$ between the lenses are noted.

Having described the basic configuration of the novel zoom lens system, the optical design data which has been found to be successful in fulfilling the stated objects in a preferred form of the present invention are given in the following tables. In the tables, the various lenses are designated in ascending order from the front of the objective to the rear of the image end of the system with light assumed to come from the front of the objective. Furthermore, given values in Table I for the successive radii of the lens surfaces $A_1$ – $Q_2$ are preceded by a plus or minus sign, the minus (–) sign designating those surfaces with their centers of curvature on the object side of that surface. The radii of the front and rear surfaces of the individual lenses are denoted respectively, as $(X)_1$ and $(X)_2$. All values are given in millimeters. EFL is the effective focal length of the system.

TABLE I

| Lens or Airspace | Thickness, mm. | Radius, mm. $(X)_1$ | $(X)_2$ |
|---|---|---|---|
| A | 11.400 | 529.1456 | 225.7444 |
| $S_1$ | 5.006 | | |
| B | 30.746 | 223.0895 | –6394.1427 |
| $S_2$ | .380 | | |
| C | 18.775 | 202.0815 | 563.1578 |
| $S_3$ | 10.081[1] – 166.461[2] | | |
| D | 5.700 | 408.8243 | 90.5873 |
| $S_4$ | 16.603 | | |

TABLE I-Continued

| Lens or Airspace | Thickness, mm. | Radius, mm. $(X)_1$ | $(X)_2$ |
|---|---|---|---|
| E | 9.354 | –1237.2898 | |
| F | 2.000 | –143.9374 | –381.4534 |
| $S_5$ | 62.390[1] – 13.804[2] | | |
| G | 5.700 | –113.1201 | |
| H | 8.530 | 106.4109 | –3839.1814 |
| $S_6$ | 73.545[1] – 1.962[2] | | |
| J | 11.200 | 313.4531 | –204.0259 |
| $S_7$ | .750 | | |
| K | 28.600 | 161.7252 | |
| L | 5.640 | –91.3832 | –246.6898 |
| $S_8$ | 51.573[1] – 59.318[2] | | |
| M | 17.296 | 188.7332 | |
| N | 5.640 | –83.8914 | 139.3239 |
| $S_9$ | 4.880 | | |
| P | 12.032 | –2879.6346 | –241.1396 |
| $S_{10}$ | 34.461 | | |
| Q | 9.400 | –69.1896 | –123.4984 |

Note:
(1) At 6" (152.0 mm.) EFL (min.)
(2) At 18" (456.1 mm.) EFL (max.)

Table II hereinbelow, gives the range of values N for the refractive indices of the lenses as well as the Abbe number V.

TABLE II

| Lens | Refractive Index | V |
|---|---|---|
| A | 1.776047 < N < 1.791794 | 49.830 |
| B | 1.485345 < N < 1.489142 | 128.386 |
| C | 1.687162 < N < 1.694011 | 100.887 |
| D | 1.842584 < N < 1.856493 | 61.127 |
| E | 1.720846 < N < 1.734298 | 54.136 |
| F | 1.775592 < N < 1.786783 | 69.861 |
| G | 1.600073 < N < 1.605483 | 111.491 |
| H | 1.836508 < N < 1.855035 | 45.700 |
| J | 1.485345 < N < 1.489142 | 128.386 |
| K | 1.485345 < N < 1.489142 | 128.386 |
| L | 1.796087 < N < 1.812647 | 48.622 |
| M | 1.637240 < N < 1.643036 | 110.513 |
| N | 1.511693 < N < 1.516779 | 101.174 |
| P | 1.692966 < N < 1.699796 | 102.024 |
| Q | 1.796087 < N < 1.812647 | 48.622 |

Table III, below, gives the Gaussian optics characteristics of each of the lens as shown. K is the reciprocal focal length or lens power. LPP is the distance from the vertex of the first surface of the pertinent lens to the first nodal point of the lens and L'PP is the distance from the last vertex of the pertinent lens to the second nodal point.

TABLE III

LENS COMPONENT POWERS

| INCLUSIVE SURFACE NO. | K POWER | LPP | L'PP |
|---|---|---|---|
| $A_1$–$A_2$ | –.001960 | 11.33 | 4.83 |
| $B_1$–$B_2$ | +.002258 | .69 | –20.0 |
| $C_1$–$C_2$ | +.002239 | –6.08 | –16.96 |
| $D_1$–$D_2$ | –.007246 | 3.99 | .88 |
| $E_1$–$F_2$ | +.001096 | 10.38 | 3.89 |
| $G_1$–$H_2$ | –.002772 | –3.58 | –11.84 |
| $J_1$–$J_2$ | +.003917 | 4.59 | –2.99 |
| $K_1$–$L_2$ | +.002817 | 2.41 | –20.29 |
| $M_1$–$N_2$ | +.001347 | –27.20 | –39.95 |
| $P_1$–$P_2$ | +.002653 | 7.72 | .64 |
| $Q_1$–$Q_2$ | –.004722 | –7.19 | –12.83 |
| $A_1$–$C_2$ | +.002534 | 25.48 | –17.98 |
| $D_1$–$F_2$ | –.005942 | –.83 | –27.94 |
| $G_1$–$H_2$ | –.002772 | –3.58 | –11.84 |
| $J_1$–$L_2$ | –.006665 | 7.19 | –23.90 |
| $M_1$–$Q_2$ | –.009710 | 2207.34 | 1761.29 |

Thus it may be seen that there has been provided a novel compact zoom lens system utilizing high quality lenses that provide improved resolution at reduced costs and minimum fabrication problems.

Of course, many modifications and variations of the invention are possible in light of the disclosure. This is especially true of optics manufacturing techniques wherein the design is often varied, within tolerances well known to those skilled in the art, to more effectively utilize the tools available. Moreover, due to the limited sources of optic materials, substitutions may be made which will provide substantially identical optical effects.

What is claimed is:

1. A variable focal length zoom lens system having five lens groups successively positioned beginning with the group nearest the object end and ending with the group nearest the image end, comprising:

a first lens group including a front singlet negative meniscus lens A, a double convex singlet lens B spaced rearwardly of said lens A at a fixed axial distance $S_1$, and a second singlet positive meniscus lens C spaced rearwardly of said lens B at a fixed axial distance $S_2$;

a second lens group movable relative to said first lens group over a variable axial distance $S_3$ including a front singlet negative meniscus lens D, a positive meniscus lens E spaced rearwardly of said lens D at a fixed axial distance $S_4$, and a negative meniscus lens F positioned rearwardly of said lens E and forming a doublet lens therewith;

a third lens group movable relative to said second lens group over a variable axial distance $S_5$ including a front double concave lens G and a positive meniscus lens H positioned rearwardly of said lens G and forming a doublet lens therewith;

a fourth lens group movable relative to said third lens group over a variable axial distance $S_6$ including a first double convex lens J, a second double convex lens K spaced rearwardly from said lens J at a fixed axial distance $S_7$ and a negative meniscus lens L positioned rearwardly of said lens K and forming a doublet lens therewith; and a fifth lens group including a front double convex lens M, a double concave lens N positioned rearwardly of said lens M and forming a doublet lens therewith, a positive meniscus lens P spaced rearwardly of said lens N at a fixed axial distance $S_9$ and a negative meniscus lens Q spaced rearwardly of said lens P at a fixed axial distance $S_{10}$, said fourth lens group being movable relative to said fifth lens group over a variable axial distance $S_8$;

the values for the thicknesses and the front surface $(X)_1$ and rear surface $(X)_2$ radii of said lenses A to Q and said fixed distances S being substantially as given in the table hereinbelow,

| Lens or Distance (S) | Thickness mm. | Radius, mm. $(X)_1$ | Radius, mm. $(X)_2$ |
|---|---|---|---|
| A | 11.400 | 529.1456 | 225.7444 |
| $S_1$ | 5.006 | | |
| B | 30.746 | 223.0895 | −6394.1427 |
| $S_2$ | .380 | | |
| C | 18.775 | 202.0815 | 563.1578 |
| D | 5.700 | 408.8243 | 90.5873 |
| $S_4$ | 16.603 | | |
| E | 9.354 | −1237.2898 | |
| F | 2.000 | −143.9374 | −381.4534 |
| G | 5.700 | −113.1201 | |
| H | 8.530 | 106.4109 | −3839.1814 |
| J | 11.200 | 313.4531 | −204.0259 |
| $S_7$ | .750 | | |
| K | 28.600 | 161.7252 | |
| L | 5.640 | −91.3832 | −246.6898 |
| M | 17.296 | 188.7332 | |
| N | 5.640 | −83.8914 | 139.3239 |
| $S_9$ | 4.880 | | |
| P | 12.032 | −2879.6346 | −241.1396 |
| $S_{10}$ | 34.461 | | |
| Q | 9.400 | −69.1896 | −123.4984 | the values for said variable distances S being substantially as given in the table hereinbelow,

| | | |
|---|---|---|
| 10.081 mm. | $< S_3 <$ | 166.461 mm. |
| 13.804 mm. | $< S_5 <$ | 62.390 mm. |
| 1.962 mm. | $< S_6 <$ | 73.545 mm. |
| 51.573 mm. | $< S_8 <$ | 59.318 mm. |

2. A variable focal length system as described in claim 1 wherein: the values for the refractive index (N) and Abbe number (V) of said lenses A to Q are substantially as given in the table hereinbelow,

| Lens | Refractive Index | V |
|---|---|---|
| A | $1.776047 < N < 1.791794$ | 49.830 |
| B | $1.485345 < N < 1.489142$ | 128.386 |
| C | $1.687162 < N < 1.694011$ | 100.887 |
| D | $1.842584 < N < 1.856493$ | 61.127 |
| E | $1.720846 < N < 1.734298$ | 54.136 |
| F | $1.775592 < N < 1.786783$ | 69.861 |
| G | $1.600073 < N < 1.605483$ | 111.491 |
| H | $1.836508 < N < 1.855035$ | 45.700 |
| J | $1.485345 < N < 1.489142$ | 128.386 |
| K | $1.485345 < N < 1.489142$ | 128.386 |
| L | $1.796087 < N < 1.812647$ | 48.622 |
| M | $1.637240 < N < 1.643036$ | 110.513 |
| N | $1.511693 < N < 1.516779$ | 101.174 |
| P | $1.692966 < N < 1.699796$ | 102.024 |
| Q | $1.796087 < N < 1.812647$ | 48.622 |

3. A variable focal length system as described in claim 2 wherein: the values for the lens power (K) of said lenses A to Q are substantially as given in the table hereinbelow,

| Inclusive Surface No. | K |
|---|---|
| $A_1$–$A_2$ | −.001960 |
| $B_1$–$B_2$ | +.002258 |
| $C_1$–$C_2$ | +.002239 |
| $D_1$–$D_2$ | −.007246 |
| $E_1$–$F_2$ | +.001096 |
| $G_1$–$H_2$ | −.002772 |
| $J_1$–$J_2$ | +.003917 |
| $K_1$–$L_2$ | +.002817 |
| $M_1$–$N_2$ | +.001347 |
| $P_1$–$P_2$ | +.002653 |
| $Q_1$–$Q_2$ | −.004722 |
| $A_1$–$C_2$ | +.002534 |
| $D_1$–$F_2$ | −.005942 |
| $G_1$–$H_2$ | −.002772 |
| $J_1$–$L_2$ | −.006665 |
| $M_1$–$Q_2$ | −.009710 |

* * * * *